US007930079B2

(12) United States Patent
Toya et al.

(10) Patent No.: US 7,930,079 B2
(45) Date of Patent: Apr. 19, 2011

(54) SOFTWARE SYSTEM OF ELECTRONIC CONTROL UNIT FOR VEHICLE AND DESIGN METHOD THEREOF

(75) Inventors: Takayuki Toya, Kariya (JP); Minoru Okada, Gifu (JP); Takashi Sugiyama, Okazaki (JP)

(73) Assignee: Denso Corporation, Kariya (JP)

( * ) Notice: Subject to any disclaimer, the term of this patent is extended or adjusted under 35 U.S.C. 154(b) by 1064 days.

(21) Appl. No.: 11/725,956

(22) Filed: Mar. 20, 2007

(65) Prior Publication Data

US 2007/0225873 A1 Sep. 27, 2007

(30) Foreign Application Priority Data

Mar. 23, 2006 (JP) ................................ 2006-080844

(51) Int. Cl.
*G06F 7/00* (2006.01)

(52) U.S. Cl. ............. 701/36; 701/1; 717/107; 717/108; 717/140; 717/141

(58) Field of Classification Search .................... 701/36, 701/1; 717/100, 107–108, 140–141
See application file for complete search history.

(56) References Cited

U.S. PATENT DOCUMENTS 4,280,060 A * 7/1981 Kure-Jensen et al. ...... 290/40 R
4,486,148 A * 12/1984 Battah .............................. 417/2
5,069,193 A * 12/1991 Erhard .......................... 123/335
5,105,794 A * 4/1992 Fukuda ......................... 123/651
5,111,798 A * 5/1992 Notaras et al. ................ 123/637
5,635,801 A * 6/1997 Regazzi et al. ........ 315/209 CD
6,236,909 B1 5/2001 Colson et al.
6,370,682 B1 4/2002 Eckardt et al.
6,571,769 B2 * 6/2003 Uemura ................... 123/406.57
6,671,659 B2 * 12/2003 Troia et al. .................... 702/188
6,701,896 B2 * 3/2004 Kiessling ................. 123/406.57
6,718,533 B1 * 4/2004 Schneider et al. ............ 717/100
6,865,429 B1 * 3/2005 Schneider et al. .............. 700/86
7,156,075 B2 * 1/2007 Kiessling ................. 123/406.56
7,546,836 B2 * 6/2009 Andersson et al. ........... 123/605
2007/0225873 A1 * 9/2007 Toya et al. ........................ 701/1

FOREIGN PATENT DOCUMENTS

DE 2261156 * 12/1972

(Continued)

OTHER PUBLICATIONS

Message Scheduling for the FlexRay Protocol: The Static Segment:; Schmidt, K.; Schmidt, E.G.; Vehicular Technology, IEEE Transactions on; vol. 58, Issue: 5; Digital Object Identifier: 10.1109/TVT.2008.2008654; Publication Year: 2009 , pp. 2170-2179.*

(Continued)

*Primary Examiner* — Cuong H Nguyen
(74) *Attorney, Agent, or Firm* — Harness, Dickey & Pierce, PLC

(57) ABSTRACT

A software system for use in an electronic control unit (ECU) is designed to facilitate its reuse without redesigning of triggers even when a target hardware is changed. The design of the software system includes a classification of trigger types into two categories, that is, a function trigger and a software trigger, and combination of the function trigger to the software tasks in addition to the association of the function triggers with the software triggers for hardware independent design of the software system.

7 Claims, 6 Drawing Sheets

FOREIGN PATENT DOCUMENTS

| | | | |
|---|---|---|---|
| DE | 4017478 | * | 5/1990 |
| DE | 102 32 756 | * | 7/2002 |
| EP | 04019782 | * | 8/2004 |
| IT | MI94A1663 | * | 7/1994 |
| JP | 2001-239626 | * | 8/2001 |
| JP | 2006-080844 | * | 3/2006 |

OTHER PUBLICATIONS

A modular system architecture for autonomous robots based on blackboard and publish-subscribe mechanisms; Limsoonthrakul, S.; Dailey, M.N.; Srisupundit, M.; Suwan Tongphu; Parnichkun, M.; Robotics and Biomimetics, 2008, ROBIO 2008. IEEE Inter. Conf. on; Digital Object Identifier: 10.1109/ROBIO.2009.4913075; Pub. Year: 2009 , pp. 633-638.*

Lock-Free Synchronization of Data Flow between Time-Triggered and Event-Triggered Activities in a Dependable Real-Time System; Templ, J.; Pletzer, J.; Pree, W.; Dependability, 2009. DEPEND '09. Second International Conference on Digital Object Identifier: 10.1109/DEPEND.2009.19; Publication Year: 2009 , pp. 87-92.*

Message Scheduling for the FlexRay Protocol: The Static Segment; Schmidt, K.; Schmidt, E.G.; Vehicular Technology, IEEE Transactions on; vol. 58 , Issue: 5; Digital Object Identifier: 10.1109/TVT.2008.2008654; Publication Year: 2009 , pp. 2170-2179.*

Temporal Partitioning of Communication Resources in an Integrated Architecture; Obermaisser, R.; Dependable and Secure Computing, IEEE Transactions on; vol. 5 , Issue: 2; Digital Object Identifier: 10.1109/TDSC.2007.70232 Publication Year: 2008 , pp. 99-114.*

Towards a DECOS Fault Injection Platform for Time-Triggered Systems; Eriksson, H.; Vinter, J.; Leiner, B.; Schlager, M.; Industrial Informatics, 2007 5th IEEE International Conference on; vol. 2; Digital Object Identifier: 10.1109/INDIN.2007.4384911; Publication Year: 2007 , pp. 1001-1006.*

Software-Based Cache Coherence with Hardware-Assisted Selective Self Invalidations Using Bloom Filters; Ashby, T; DÂ. az, P; Cintra, M; Computers, IEEE Transactions on; vol. PP , Issue: 99; Digital Object Identifier: 10.1109/TC.2010.155 Pub. Year: 2010 , p. 1.*

Event-Triggered Real-Time Scheduling of Stabilizing Control Tasks; Tabuada, P.; Automatic Control, IEEE Transactions on vol. 52 , Issue: 9; Digital Object Identifier: 10.1109/TAC.2007.904277; Publication Year: 2007 , pp. 1680-1685.*

Office action dated Mar. 3, 2009 in German Application No. 10 2007 013 967.7.

* cited by examiner

VEHICLE COORDINATOR 101
VEHICLE MOTION COORDINATOR 102
BRAKE CNTL. COMP. 106
POWER TRAIN COORDINATOR 103
ENGINE CNTL. COMP. 104
TRANSMISSION CNTL. COMP. 105
211
212
213
214
215
216
T1
T2
T3
T4
T5
T6

POWER TRAIN COORDINATOR
ENGINE CNTL. COMP.
EVENT TASKS
PERIODIC TASKS
PERIODIC TASKS
TIME
103
104
501
502
503
504
505
506
507
508
509
510
511
512
513
601
604
602—a
605—a
602—b
605—b
602—c
605—c
602—d
605—d
603—b
606—b
PT_Event_ Trigger
PT_8m_ Trigger
ENG_8m_ Trigger
ENG_4m_ Trigger
Trigger_Event_A
Trigger_4m
Trigger_8m FUNCTION
TRIGGERS
SOFTWARE TASKS
501
502
503
504
103
508
509
505
506
104
507
RE
FUNCTION TRIGGER
510
511
513
512
EVENT TASK
601
PERIODIC (8ms) TASK
603
PERIODIC (4ms) TASK
602

SOFTWARE SYSTEM OF ELECTRONIC CONTROL UNIT FOR VEHICLE AND DESIGN METHOD THEREOF

CROSS REFERENCE TO RELATED APPLICATION

This application is based on and claims the benefit of priority of Japanese Patent Application No. 2006-80844 filed on Mar. 23, 2006, the disclosure of which is incorporated herein by reference.

FIELD OF THE INVENTION

The present invention generally relates to a software system of electronic control units (ECUs) for use in a vehicle.

BACKGROUND INFORMATION

In recent years, a software structure such as the one in Japanese patent document JP-A-2001-109628 is proposed for improving an efficiency of reuse of an application software on various different platforms.

That is, in the software structure disclosed above, each of plural components in the application software is configured to have an interface and a body to implement a certain function, and is used to compose the application software in a framework that the components in the application software operate independently with each other. In this manner, the reuse of the application software and independency of platforms (hardware) are both realized.

Further, the reuse of the software is enabled by using an independent trigger design policy that a trigger, i.e., an event routine (e.g., a type of a script program), for triggering a process in the component is designed independently for each of the components.

However, in designing a vehicle control system, the reuse of the software cannot be realized by only designing the trigger independently for each of the components. This is because the software design of each of the triggers must take a corresponding hardware that generates each of the triggers into consideration.

For example, when a trigger is periodically generated, that is, when a certain function being triggered by the trigger is periodically used, a timer function of a microprocessor is used to give generation timings for the trigger in general. In addition, when the trigger is used in synchronization with a function implemented by other ECU, synchronicity of a time-trigger type communication protocol such as FlexRay is used for triggering. That is, for example, when the trigger is used periodically in synchronization with a function implemented by other ECU, the timer in a communication controller is used for generating the trigger. Further, when the trigger is used in synchronization with a control request from a function implemented by other ECU, reception of the control request trough a network is used for generating the trigger.

Therefore, in the trigger design of vehicle control scheme, consideration of the corresponding hardware is required for all of the above-described cases. As a result, when the hardware for implementing a specific function (i.e., for implementing an application software) is changed, the corresponding trigger has to be re-designed.

SUMMARY OF THE INVENTION

In view of the above-described and other problems, the present disclosure provides a software system of vehicular ECU (electronic control unit) that can be reused without redesigning a trigger when a corresponding hardware of the trigger is replaced.

In one aspect of the present disclosure, the software system for use in a vehicle electronic control unit of a vehicle control network includes plural software components for at least implementing plural vehicle control functions to the vehicle electronic control unit. The plural tasks that are started by electronic control unit software in the vehicle electronic control unit are respectively associated with plural function triggers, and each of the plural function triggers is invoked by at least one of the plural tasks in association with the each of the plural function triggers for implementing the plural vehicle control functions. In this manner, the function design of the software system is conducted independently from hardware. In other words, reuse of the software system on different hardware is facilitated due to the independency of the software system from the hardware design.

For example, an event task and periodic tasks are provided for invocation by an event trigger derived from the hardware such as a vehicle control network or a vehicular electronic control unit invocation by periodic trippers derived from a timer function of the vehicular electronic control unit or a synchronization timer of the vehicle control network.

In this case, the periodic tasks may retain operation information on operation conditions of the plural software components, and the periodic tasks may not output the function triggers when the operation information indicates non-operation of the plural software components. Therefore, the operation consistency between operation of respective functions and corresponding "runnable entities" that actually implements functional operations of the software system is guaranteed.

In addition, the present invention can be represented and grasped as a design methodology of software for use in the ECU.

That is, the method of designing a software system used in plural electronic control units of a vehicle control network includes steps of dividing vehicle control functions into plural software components, structuring the plural software components into hierarchical layers, designing an execution sequence of the plural software components by assigning a function trigger to each of the plural software components, implementing each of the plural software components respectively to the electronic control units, preparing structured detail functions for each of the plural software components based on analyzing a function of each of the plural software components, setting function triggers for executing the structured detail functions, and designing software task arrangement by assigning the function triggers to the software tasks. In this manner, the software design is conducted solely independent from the constraints and/or restrictions of a target hardware. Therefore, the reuse of the components in the software system is facilitated.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention will be described with reference to the accompanying drawings.

Figure 1:
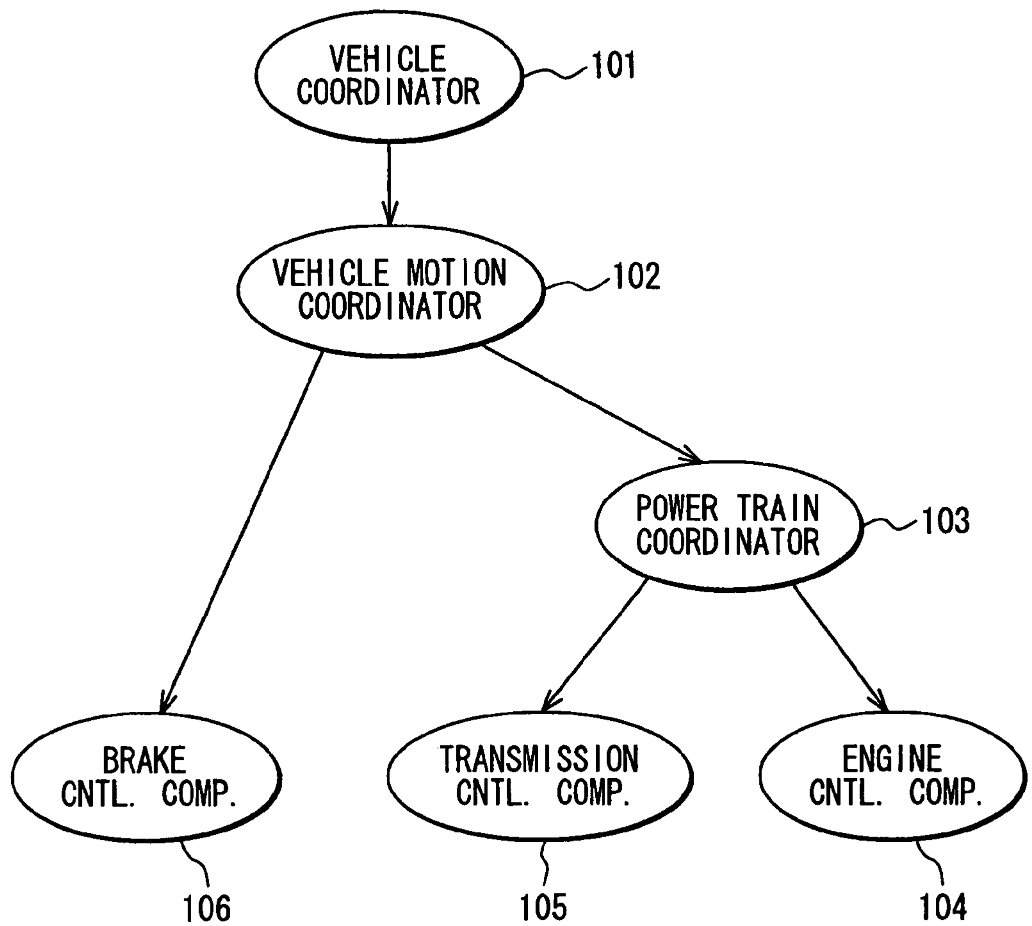
FIG. 1 shows a block diagram of functional structure of a vehicle control network system in an embodiment of the present disclosure.

FIG. 1 is a block diagram showing a part of a functional structure of a vehicle control network system. There are various other functions included in the vehicle control network system in addition to the functions illustrated therein. However, only functions used in the description of the present invention are shown in FIG. 1.

As shown in FIG. 1, as functions (components) included in the vehicle control network system, for example, there are a vehicle coordinator 101 in the uppermost stream and a vehicle motion coordinator 102 in the downstream thereof. A power train coordinator 103 is used in the downstream of the vehicle motion coordinator 102, and further in the downstream of the power train coordinator 103, an engine control component 104 and a transmission control component 105 are used. Moreover, in the vehicle motion coordinator 102, in addition to the power train coordinator 103, a brake control component 106 is also used.

The vehicle coordinator 101 calculates a required quantity of operation that a driver requests from the vehicle, such as a required acceleration and deceleration speed and a required yaw rate, based on information about driver operations (accelerator pedal and brake pedal operations), and passes the result to the lower vehicle motion coordinator 102.

The vehicle motion coordinator 102 calculates a momentary vehicle motion request to stably achieve a request of vehicle motion based on a driver's request passed from the upper vehicle coordinator 101. For example, it passes required values such as required axle torque and required control torque to the power train coordinator 103 and the brake control component 106, respectively.

The power train coordinator 103 calculates required values such as required engine torque and required gear necessary to realize the required values such as required axle torque passed from the vehicle motion coordinator 102 in an upper hierarchy, and passes them to the engine control component 104 and the transmission control component 105, respectively. In this manner, the control components 104 and 105 control targeted actuators, for example, an engine throttle and an automatic transmission (hereinafter referred to as AT), so as to realize the required values.

Likewise, the brake control component 106 performs the above-described control to realize the required drive torque passed from the upper vehicle motion coordinator 102. For example, it causes the respective wheels to generate brake force by driving motors for pump driving and various control valves in an ABS actuator.

Figure 2:
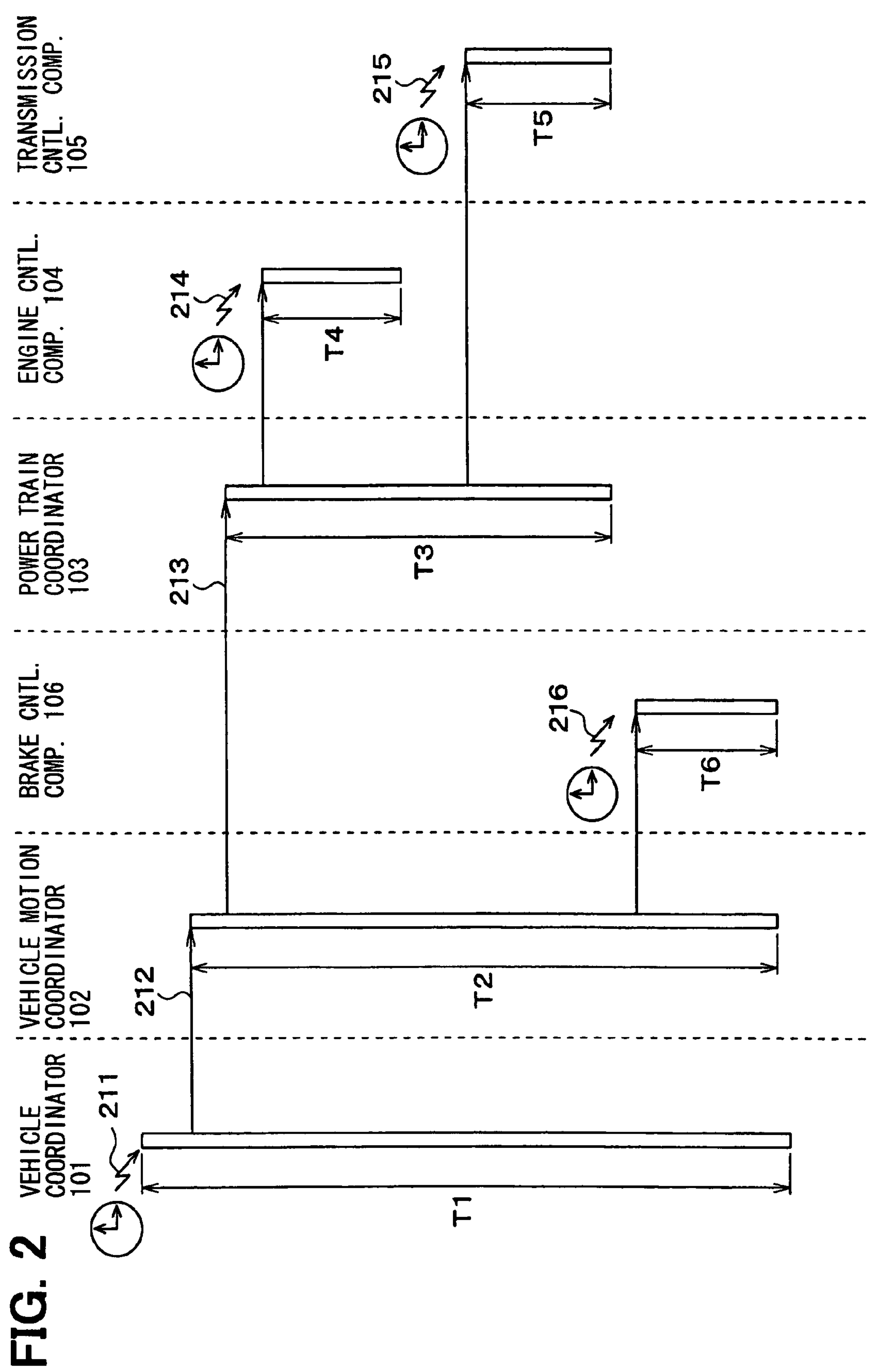
FIG. 2 shows a time chart of a process sequence of respective components shown in FIG. 1.

FIG. 2 is a drawing showing a time chart of the respective components constituting the vehicle functional structure shown in FIG. 1.

The vehicle coordinator 101 is activated by a function trigger 211 periodically generated and performs processing in a predetermined period T1. In this period, a control request is generated by the vehicle coordinator 101 to the vehicle motion coordinator 102 in a lower hierarchy, and a required quantity of operation that the driver requests from the vehicle is conveyed.

The vehicle motion coordinator 102 activates a control request generated by the vehicle coordinator 101 as a function trigger 212 and performs processing in a predetermined period T2. In this period, a control request is generated by the vehicle motion coordinator 102 to the lower power train coordinator 103 and brake control component 106, and required values such as required wheel torque and required control torque are conveyed.

The power train coordinator 103 activates the control request generated by the vehicle motion coordinator 102 as a function trigger 213, and performs processing in a predetermined period T3. In this period, a control request is generated by the power train coordinator 103 to the lower engine control component 104 and transmission control component 105, and required values such as required engine torque and a required speed change step are conveyed.

The engine control component 104 is activated by a function trigger 214 independently and periodically generated, irrespective of a generation timing of a control request generated by the vehicle motion coordinator 102, and performs processing in a predetermined period T4.

The transmission control component 105 is activated by a function trigger 215 independently and periodically generated, irrespective of a generation timing of a control request generated by the vehicle motion coordinator 102, and performs processing in a predetermined period T5.

Likewise, the brake control component 106 is activated by a function trigger 216 independently and periodically generated, irrespective of a generation timing of a control request generated by the vehicle motion coordinator 102, and performs processing in a predetermined period T6.

Figure 3:
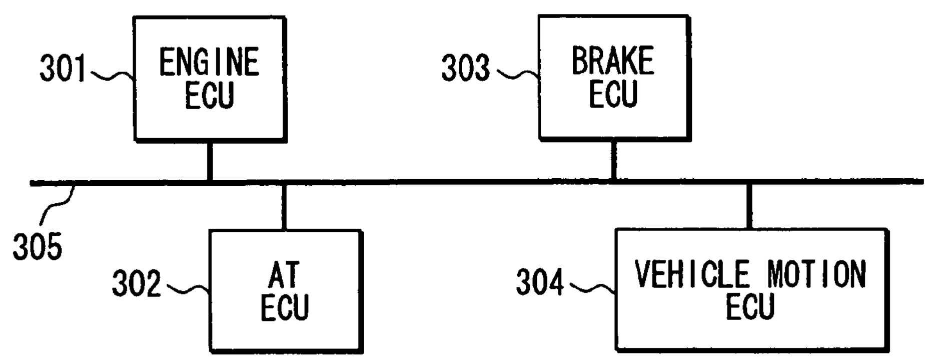
FIG. 3 shows a block diagram of the vehicle control network system in the embodiment.

FIG. 3 is a block diagram of the vehicle control network system. ECUs 301 to 304 are connected with one another via a communications line 305 to form the network, and control the entire vehicle by mutually communicating data.

The engine ECU 301 controls the engine. The AT-ECU 302 controls the automatic transmission. The brake ECU 303 controls the brake. The vehicle motion ECU 304 performs calculations for stabilizing the motion of the vehicle, and transmits required values to the respective ECUs. The ECUs 301 to 304 concerned in the control of the vehicle are connected to the communication line 305 and perform communications.

Figure 4:
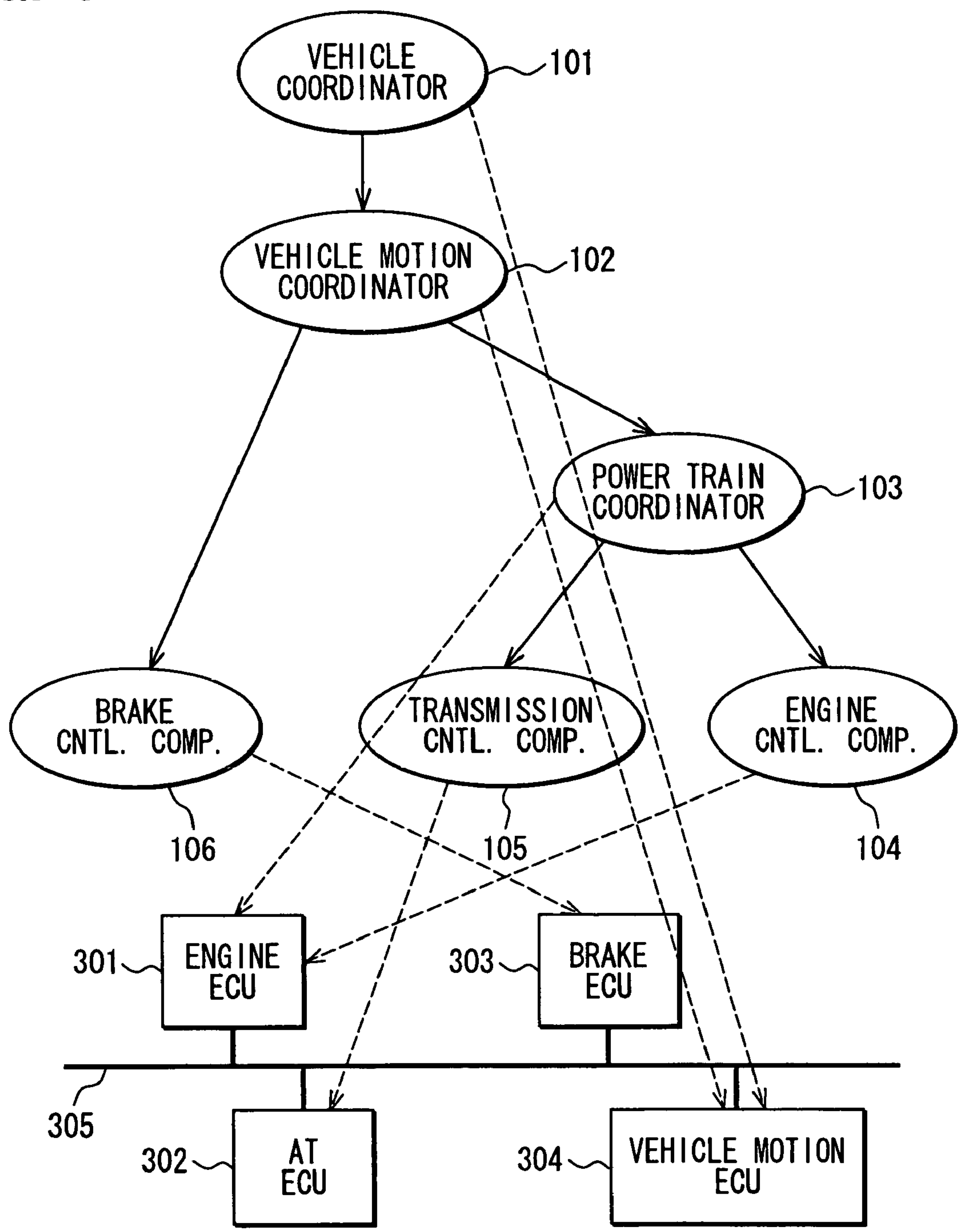
FIG. 4 shows a block diagram of the vehicle control network system in association with the components shown in FIG. 2.

FIG. 4 shows an example of distributed arrangement of the functions (components) constituting the functional structure shown in FIG. 2 in the ECUs constituting the vehicle control network system shown in FIG. 3.

In FIG. 4, the vehicle coordinator 101 and the vehicle motion coordinator 102 are used in the vehicle motion ECU 304, the brake control component 106 is used in the brake ECU 303, the power train coordinator 103 and the engine control component 104 are used in the engine ECU 301, and the transmission control component 105 is used in the AT-ECU 302.

Although, in the above description, each function (i.e., component) is used only in one ECU, it does not always need to be used in only one ECU. That is, one function may be split into two or more modules to be implement by plural ECUs.

Figure 5:
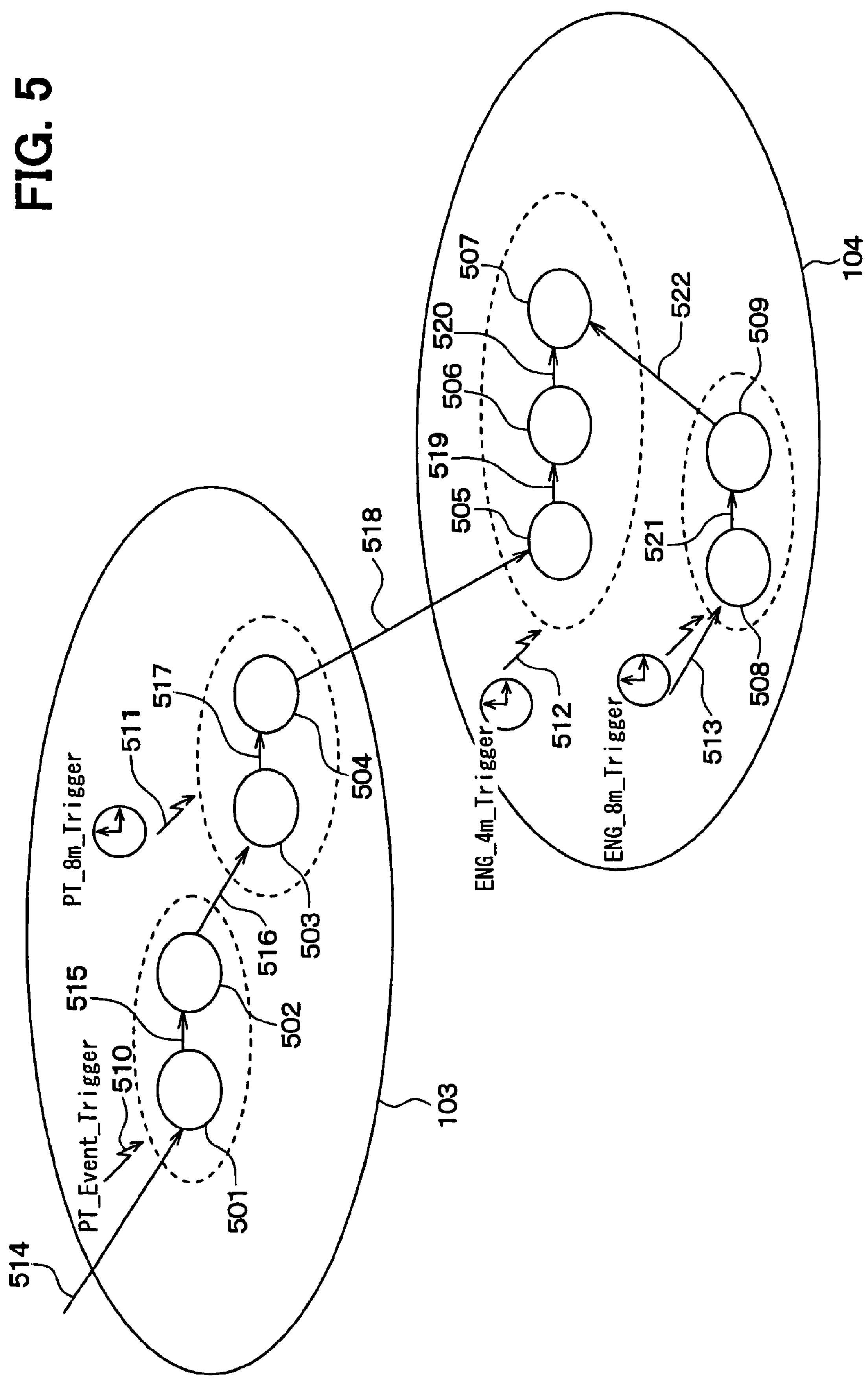
FIG. 5 shows a block diagram of functional structures of the components in association with activation triggers.

FIG. 5 shows the structure of functions analyzed to refine the respective functions of the power train coordinator 103 and the engine control component 104 that are used in the engine ECU 301, and activation triggers of the functions.

When functions included in power train coordinator 103 are analyzed in detail and structured, they are split into program control logics 501 to 504. Each of functions thus split corresponds to an execution unit on software, and the execution unit is referred to as a runnable entity (RE). Likewise, the engine control component 104 is split into REs 505 to 509.

The arrows 514 to 522 in the drawing show the flow of data, and represent the passing of calculation results in the REs 501 to 504 and the REs 505 to 508 to a next RE and also an execution order of REs. The arrow 514 represents a control request from the vehicle motion coordinator 102, which is superior to the power train coordinator 103, and an I/F between components.

Likewise, the arrow 518 represents a control request from the power train coordinator 103 to the engine control component 104. The arrows 510 to 513 represent function triggers that execute the REs 501 to 509; the REs 501 and 502 are executed by a function trigger 510, the REs 503 and 504 are executed by a function trigger 511, the REs 505 to 507 are executed by a function trigger 512, and the REs 508 and 509 are executed by a function trigger 513.

The function trigger 510 is a trigger (PT_EVENT_Trigger) triggered synchronously with the reception of a control request from the vehicle motion coordinator 102, which is superior to the power train coordinator 103. The function trigger 511 is a trigger (PT__8 m_Trigger) triggered every 8 milliseconds. The function trigger 512 is a trigger (PT__4 m_Trigger) triggered every 4 milliseconds. The function trigger 513 is also a trigger (PT__8 m_Trigger) triggered every 8 milliseconds.

Figure 6:
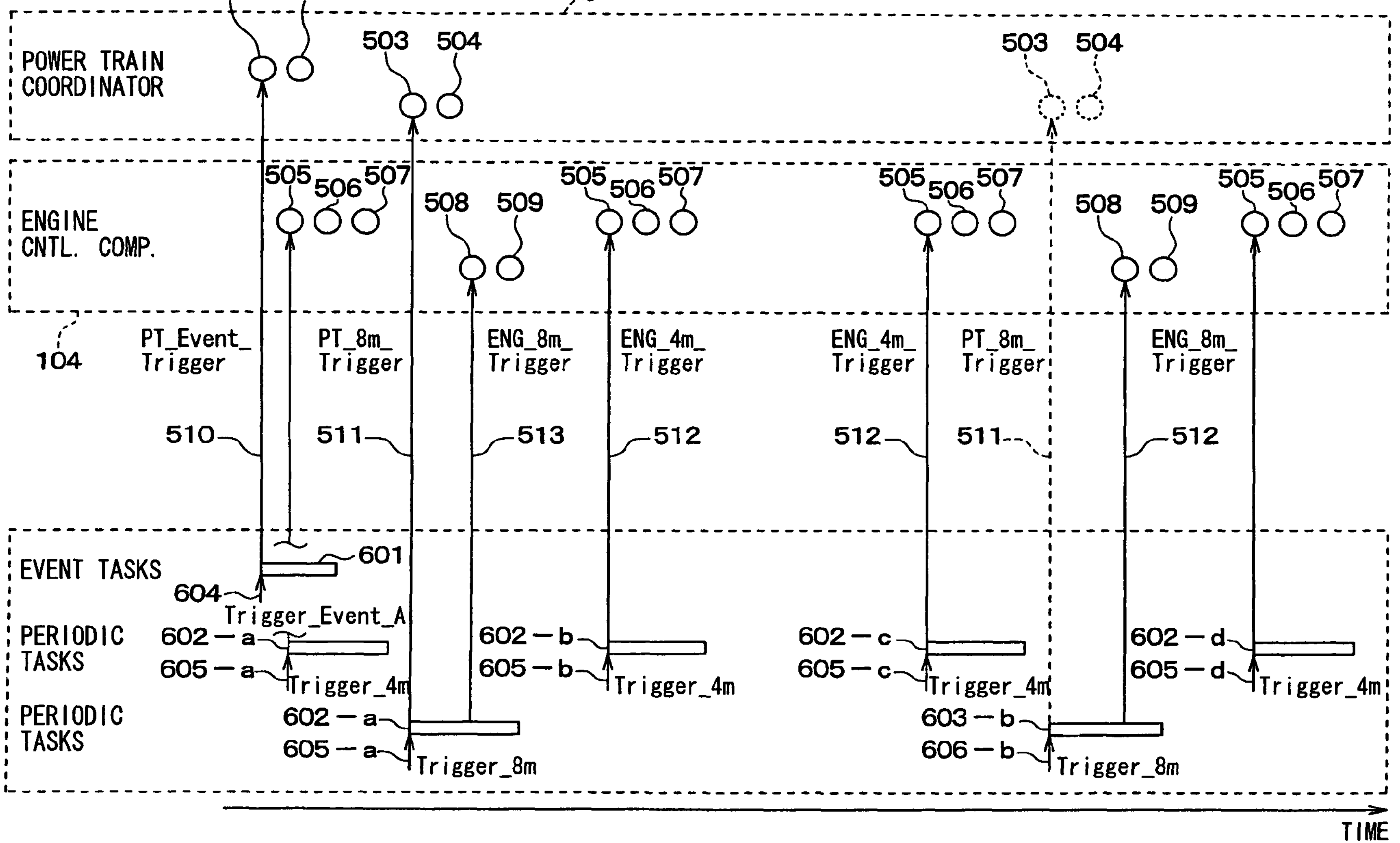
FIG. 6 shows a time chart of runnable entities in association with triggers and tasks in an engine ECU.
Figure 7:
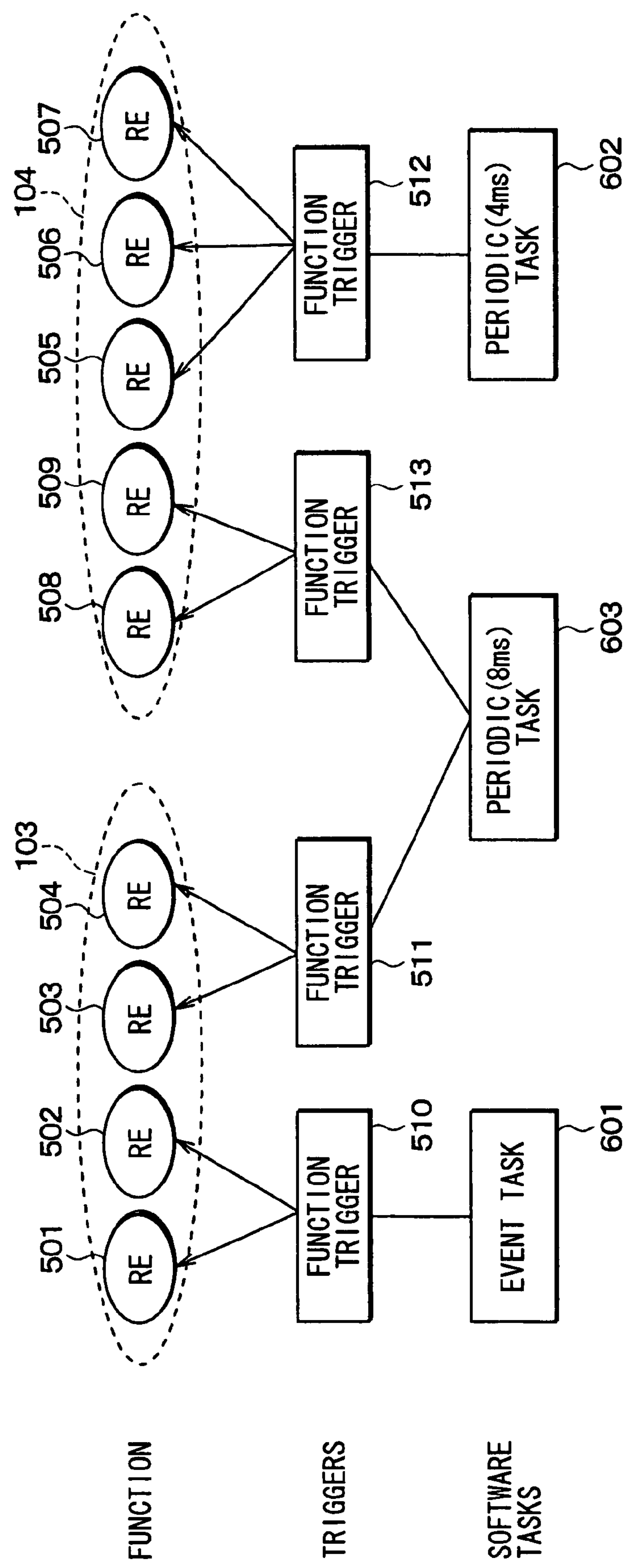
FIG. 7 shows a block diagram of software tasks in association with triggers and runnable entities.

FIG. 6 is a timing chart showing a relationship between the REs 501 to 509 implemented in the engine ECU 301 and the function triggers 510 to 513 and tasks that execute them. FIG. 7 is a block diagram showing the correspondences between tasks (software tasks) 601 to 603, and the function triggers 510 to 513, and the correspondences between the function triggers 510 to 513, and the REs 501 to 509 run by them.

The tasks 601 to 603 are activated by software such as an OS (Operating System) implemented in each ECU, and as shown in FIG. 6, the software triggers 604 to 606 cause the tasks to be activated. These software triggers 604 to 606 are triggered by hardware. For example, the software triggers 605 and 606 are triggered by an internal timer of a microcomputer, or by a synchronous timer of the communication line 305 if the communication line is a time-trigger type such as FlexRay.

For example, as shown in FIG. 6, as an execution trigger of the event task 601 that executes interrupt processing, the software trigger 604 (Trigger_Event_A) triggered on the reception of network data is used.

In FIG. 6, the software triggers 605 and 606 and the periodic tasks 602 and 603 are added with subscripts (a to d). The subscripts are meant to enable easy understanding of a correspondence between the software triggers 605 and 606 triggered repeatedly in an interval of a fixed cycle, and the periodic tasks 602 and 603 that operate based on them.

As shown in FIG. 7, the function triggers 510 to 513 that cause the REs 501 to 509 to operate are assigned to (associated with) the tasks 601 to 603, and the REs 501 to 509 are run by the function triggers 510 to 513.

A software design method in the present embodiment will be described with reference to the above-described FIGS. 1 to 6.

In vehicle control development, as a first step, the functional structure as shown in FIG. 1 is designed. In designing the functional structure, the function of the entire vehicle divided into modules, then interfaces for observable quantities (e.g., vehicle speed) of the vehicle necessary for calculations for achieving the function, required values from other functions, and required values to other functions are stipulated. Further, components are constituted based on the interfaces and divided functional modules, and a relationship among the components is defined for a hierarchical structure. In the present embodiment, as shown in FIG. 1, as an example, a functional structure for achieving the driving and braking of a vehicle and stability by use of them is put into a hierarchical structure.

Furthermore, to allow the function of the entire vehicle to operate normally, conditions and timing of executing the respective components, that is, an execution sequence is designed. Specifically, triggers and function triggers to activate the respective components are assigned. Conditions of triggering the function triggers are defined in a form of events such as periodic and control requests. FIG. 2 shows an execution sequence in the present embodiment. The function triggers 211 to 216 of the components are set only from the standpoint of function implementation without considering the hardware in any sense.

After designing the functional structure, the components are implemented to the ECUs in the vehicle control network system. For example, in the present embodiment, since the vehicle control network system is structured as shown in FIG. 3, the components are used as shown in FIG. 4.

At this point, data flowing through the network is determined. In the present embodiment, control requests that the vehicle motion coordinator 102 sends to the brake control component 106 and the power train coordinator 103, and a control request that the power train coordinator 103 sends to the transmission control component 105 are exchanged over the network.

Although not shown in the drawing, the vehicle is provided with various sensors for observing condition quantities of the vehicle. The various sensors are connected to each ECU, and signals detected by the sensors are used to calculate control quantities in each component. Such observable quantities of the vehicle are communicated over the network, and what observable quantity is communicated is decided depending on the arrangement of functions.

After implementing the components in each of the ECUs, software design is performed. In the present embodiment, as an example of software design, software design of the engine ECU 301 will be described.

Since the power train coordinator 103 and the engine control component 104 are used in the engine ECU 301 as shown in FIG. 4, after performing an analysis for refining functions included in each of the components, REs as execution units of the respective functions are structured, and further function triggers to execute each of the REs are set. FIG. 5 shows a software structure of those REs, triggers, a component and a coorinator.

As shown in the processing sequence of FIG. 2, the power train coordinator 103 is executed with a control request from the upper vehicle motion coordinator 102 as a trigger. The control request is the data 514 in FIG. 5, and a trigger triggered synchronously with the generation of the request corresponds to the function trigger 510. When the function trigger 510 is triggered, the power train coordinator 103 is executed. That is, the REs 501 to 504 constituting the power train coordinator 103 are executed.

However, in execution timing of a component, all of the REs in the component are not always executed concurrently. For example, consider the case where an RE that performs desired calculations based on temperatures and the like exists in a part of components executed every 16 milliseconds.

Since a temperature sensor is normally slow in response, that is, the generation frequency of a detected signal is slow, it is meaningless to execute calculations using data having such a slow frequency in the fast cycle of 16 milliseconds. Therefore, only the RE that performs desired calculations based on temperatures and the like may perform calculations every 100 milliseconds, and passes the result to other REs that operate every 16 milliseconds. This is not problematic with the control of the component itself at all, and also will contribute to reduction in processing loads on the CPU.

Therefore, when REs have been structured by refining functions included in the components as described above, with the result that the frequencies of the functions are determined based on functions and the like in the upper hierarchy to the functions concerned, it is desirable to perform a function trigger design according to functions in the upper hierarchy.

In the present embodiment, of the REs constituting the power train coordinator 103, the REs 501 and 502 are executed by the event trigger 510, which is a function trigger of event type synchronous to a control request from an upper component, and other REs 503 and 504 are executed by the periodic trigger 511, which is a function trigger periodically triggered every 8 milliseconds. The same is also true for the engine control component 104. Of the REs constituting the engine control component 104, the REs 505, 506, and 507 are executed by the periodic trigger 512, which is a function trigger periodically triggered every 4 milliseconds, and the REs 508 and 509 are executed by the periodic trigger 513, which is a function trigger periodically triggered every 8 milliseconds. These function triggers are set only from the standpoint of function implementation without concern about hardware.

After a detailed design (the splitting of functions and design of function triggers) of functions implemented in each ECU has been decided, a task design is performed to use function triggers in each task as shown in FIG. 6. In the present embodiment, as tasks, the event task 601, the periodic task 602, and the periodic task 603 are set. These tasks correspond to the software triggers 604 to 606, respectively, and are activated by the OS or the like, and the software triggers 604 to 606 are triggered by hardware. The software trigger 604 as an event trigger is triggered on the reception of network data. A control request from the vehicle motion coordinator 102 superior to the power train coordinator 103 is brought over the network because the vehicle motion coordinator 102 is used in the vehicle motion ECU 304, and the software trigger 604 is activated synchronously with the reception of network data.

Therefore, the event task 601 that operates with the software trigger 604 as a triggering factor operates synchronously with the control request (network data reception) from the vehicle motion coordinator 102.

The software triggers 605 and 606 as periodic triggers is triggers triggered by a timer function of the microcomputer. In the present embodiment, the software trigger 605 is triggered every 4 milliseconds, and the software trigger 606 is triggered every 8 milliseconds. The periodic trigger may be a trigger triggered by the synchronous timer if the communications line 305 is a time-trigger type such as FlexRay. Therefore, the periodic task 602 operates every 4 milliseconds and the periodic task 603 operates every 8 milliseconds.

As described above, when the software triggers 604 to 606 are triggered by hardware, the OS activates corresponding tasks 601 to 603. The function triggers 510 to 513 to run the REs 501 to 509 are assigned to the tasks 601 to 603. The function trigger 510 is assigned to the event task 601. The function trigger 510 is triggered by the operation of the event task 601, and by the function trigger 510, the REs 501 and 502 are run synchronously with a control request from the vehicle motion coordinator 102.

For example, it is assumed that, in the power train coordinator 103, the execution cycle of functions by the REs 503 and 504 is designed as 7.5 milliseconds in the phase of function design. That is, the function trigger 511 is designed as a trigger activated at a cycle of 7.5 milliseconds. In this case, when running the REs 503 and 504 at a cycle of 8 milliseconds causes no problem with implementation of the functions, the function trigger 511 to run the REs 503 and 504 may be assigned to the periodic task 602 that operates every 8 milliseconds.

The REs 501 and 502, which are control logics of the power train coordinator 103, receive data 514 (see FIG. 5) as a required value of control generated by the upper vehicle motion coordinator 102, for example, data representative of required axle torque, and process the received required axle torque according to a state of the power train in the vehicle.

For example, they process the required axle torque into a realizable required value from vehicle states such as current torque and a vehicle speed. The function trigger 511 is assigned to the periodic task 602, the function trigger 511 is triggered by the operation of the periodic task 602, and the REs 505 to 507 are run every 4 milliseconds by the function trigger 511.

The REs 505 to 507, which are control logics of the engine control component 104, receive data 518 (see FIG. 5) as required values of control generated by the upper power train coordinator 103, for example, data representative of required engine torque, and calculate actual control quantities of actuators. They calculate control quantities such as a throttle opening degree, an injection quantity, and ignition timing, based on these control quantities, activate actuators (not shown) constituting the engine, such as an electronically controlled throttle, an electronically controlled fuel injector, and an electronically controlled ignition apparatus, and realize the required engine torque generated by the upper component.

The function triggers 511 and 513 are assigned to the periodic task 603, the function triggers 511 and 513 are triggered by the operation of the periodic task 603, and the REs 503 and 504 are run every 8 milliseconds by the function trigger 511.

The REs 503 and 504, which are control logics of the power train coordinator 103 like the REs 501 and 502, to realize required axle torque calculated (process required axle torque generated by the vehicle motion coordinator 102 according to vehicle conditions) in the REs 501 and 502, based on the received axle torque, calculate required engine torque and a required gear as required control values to the lower engine control component 104 and the transmission control component 105.

Although the data 518 of the calculated required engine torque is passed to the lower engine control component 104, it is received and passed inside the engine ECU 301 because both the power train coordinator 103 and the engine control component 104 are implemented in the engine ECU 301.

On the other hand, although the data of the calculated required gear is passed to the lower transmission control component 105, it is passed on the network through the communications line 305 because the transmission control component 105 is implemented in the AT-ECU 302. The REs 508 and 509 are run every 8 milliseconds by the periodic trigger 513.

The REs 508 and 509, which are the control logics of the engine control component 104 like the REs 505 to 507, calculate data required for the calculation of control quantities of actuators by the REs 505 to 507. For example, based on sensor values such as an engine speed sensor, an engine water temperature sensor, and an air flow sensor included in the engine although not shown, they calculate estimated engine torque and the like, and deliver the data 522 showing them to the RE 507.

In FIG. 6, in the periodic task 603-*b*, the function trigger 511 generated by the periodic task 603 when the event task 601 generates the function trigger 510, and the REs 503 and 504 run by the function trigger are shown by dotted lines. This means that, in the indicated timing, the function trigger 511 is not triggered and the REs 503 and 504 are not executed.

Although both the REs 503 and 504 are part of the power train coordinator 103, since the power train coordinator 103 is a component activated on the generation of a control request from the vehicle motion coordinator 102, that is, on the generation of the function trigger 510, the power train coordinator 103 is inactive during operation of the periodic task 603-*b*.

However, since the periodic task 603 periodically operates, triggering the function trigger 511 at each operation of the periodic task 603 would cause the operation of the REs 503 and 504 without having a function of the power train coordinator 103. Therefore, by adopting a mechanism for holding operation information the power train coordinator 103 such as a busy and stop state and by refereeing to the operation information at the time of the generation of the function trigger 511, consistency of the operation of a function (i.e., the power train coordinator 103) with the operation of an RE (i.e., the REs 503, 504) is ensured As has been described above, the function triggers 510 to 513 to operate functions (components) are separated from the software triggers 604 to 606 to actually execute programs on software, and the function trigger 510 is associated with the software tasks 601 to 603. The function triggers 510 to 513 and the software triggers 604 to 606 are combined during software design.

Such a software structure enables function design without concern about hardware. In other words, since influence of a hardware change and a change in function arrangement can be avoided, the reusability of components is achieved.

For example, as described in the present embodiment, in the case where a time-trigger type such as FlexRay is adopted for the communication line 305, and components distributedly used with high precision are synchronously activated, task design is performed based on the software triggers 604 to 606 triggered by an internal timer of the communication controller, and the function triggers 510 to 513 are assigned to the tasks 601 to 603. Therefore, the contents of function design need not be changed.

Moreover, when the vehicle motion coordinator 102 is used in the same engine ECU 301 as the power train coordinator 103, an only change required for the vehicle motion coordinator 102 is that the software trigger 604 having been triggered on the reception of network data should be triggered on the updating of a control request (the updating of RAM). In other words, the contents of function design need not be changed.

Although the present invention has been fully described in connection with the preferred embodiment thereof with reference to the accompanying drawings, it is to be noted that various changes and modifications will become apparent to those skilled in the art.

That is, the present invention describes an application of a function structure to the vehicle control network system that employs various vehicle stability control functions for secure implementation of specific vehicle motion controls based on the driver's request. However, the function structure of the above disclosure can also be applicable, in general, to a different system that includes different control functions from above description.

Such changes and modifications are to be understood as being within the scope of the present invention as defined by the appended claims.

What is claimed is:

1. A non-transitory computer readable medium storing computer-executable code configured to cause a computer to execute a software system for use in plural vehicle electronic control units of a vehicle control network, the software system being configured to implement a vehicle control function in a software component to the plural vehicle electronic control units, comprising:

plural software components configured to implement plural vehicle control functions to at least one of the plural vehicle electronic control units, wherein plural tasks are configured such that the plural tasks that are started by electronic control unit software implemented in at least one of the plural vehicle electronic control units are respectively associated with at least one of plural function triggers for execution of at least one of the plural vehicle control functions in the plural software components, and each of the plural tasks is configured to generate at least one of the plural function triggers for execution of one of the at least one of the plural software components and the at least one of the plural vehicle control functions.

2. The non-transitory computer readable medium of claim 1, wherein the plural tasks include an event task and periodic tasks, the event task is configured to start based on a hardware-dependent event trigger that configured to be generated by one of the at least one of the plural vehicle electronic control unit and the vehicle control network, and the periodic tasks are configured to start based on timer-controlled periodic triggers that are configured to be generated at a constant generation cycle based on one of a vehicle electronic control unit timer and a synchronization timer transmitted through the vehicle control network.

3. The non-transitory computer readable medium of claim 2, wherein each of the periodic tasks is configured to retains operation information on operation conditions of each of the plural software components, the operation information is configured to indicates whether each of the plural software components are in operation or not in operation, and each of the periodic tasks is configured not to output the function triggers in an operation period of one of the plural software components where the operation information of the one of the plural software components indicates that the one of the plural software components is not in operation even when at least one of the periodic tasks is started based on at least one of the periodic triggers.

4. A method of designing a software system used in plural electronic control units of a vehicle control network comprising steps of:

dividing vehicle control functions into plural software components;

structuring the plural software components into hierarchical layers;

designing an execution sequence of the plural software components by assigning a function trigger to each of the plural software components;

implementing each of the plural software components respectively to at least one of the plural electronic control units;

preparing structured sub-functions for each of the plural software components based on an analysis of a function of each of the plural software components;

setting each of the function triggers for executing one of the structured sub-functions; and designing arrangement of the function triggers in association with each of a plurality of software tasks for generation of each of the function triggers by at least one of the software tasks.

5. The method as in claim 4, wherein the plurality of software tasks are designed as an event task and periodic tasks; and each of the plurality of software tasks is associated with software triggers based on respective frequencies of execution of the software tasks.

6. The non-transitory computer readable medium of claim 2, wherein each of the periodic tasks is configured to generate a corresponding one of the function triggers based on both a corresponding one of the periodic triggers and operation information of a corresponding one of the plural software components, each of the period tasks being configured such that once the periodic task is started by the corresponding periodic trigger, the periodic task generates the corresponding function trigger if the operation information indicates the corresponding software component is operating, and the periodic task does not generate the corresponding function trigger if the operation information indicates the corresponding software component is not operating.

7. The method as in claim 5, wherein each of the periodic tasks generate a corresponding one of the function triggers based on both a corresponding one of the software triggers and operation information of a corresponding one of the plural software components such that, once the periodic task is started by the corresponding periodic trigger, the periodic task generates the corresponding function trigger if the operation information indicates the corresponding software component is operating, and the periodic task does not generate the corresponding function trigger if the operation information indicates the corresponding software component is not operating.

* * * * *